No. 669,298. Patented Mar. 5, 1901.
J. B. ADT.
TOBACCO CUTTER.
(Application filed Nov. 8, 1900.)

(No Model.) 2 Sheets—Sheet 1.

WITNESSES: INVENTOR:—

THE NORRIS PETERS CO., PHOTO-LITHO., WASHINGTON, D. C.

No. 669,298. Patented Mar. 5, 1901.
J. B. ADT.
TOBACCO CUTTER.
(Application filed Nov. 8, 1900.)

(No Model.) 2 Sheets—Sheet 2.

WITNESSES:— INVENTOR:—
A. O. Babendreier John B. Adt,
Eclip. T. Goth by W. T. Howard,
Atty.

THE NORRIS PETERS CO., PHOTO-LITHO., WASHINGTON, D. C.

UNITED STATES PATENT OFFICE.

JOHN B. ADT, OF BALTIMORE, MARYLAND.

TOBACCO-CUTTER.

SPECIFICATION forming part of Letters Patent No. 669,298, dated March 5, 1901.

Application filed November 8, 1900. Serial No. 35,808. (No model.)

*To all whom it may concern:*

Be it known that I, JOHN B. ADT, of the city of Baltimore, in the State of Maryland, have invented certain Improvements in Tobacco-Cutters, of which the following is a specification.

This invention relates to certain improvements in the inventions described in Letters Patent Nos. 400,723 and 605,371, granted to me for tobacco-cutters on the 2d day of April, 1889, and the 7th day of June, 1898, respectively, to which reference should be made. In the first of the said patented inventions I employ as cutting devices rotary saws in connection with a comb, between the teeth of which the saws extend. In the second patented invention I substitute for the comb removable independent bridge-cutters, the ends of which are curved and rest on spacing-collars between the saws.

In the present invention instead of the comb and the removable bridge-cutters above referred to I employ a fixed bar situated between the saws and extending longitudinally of their shafts, with its upper edge about on a line drawn between the centers of the said shafts. Transversely of and on the said bar I place a series of independent straight cutters of a length about equal to the distance between the collars which separate the saws and of a width slightly less than that of the separating-collars. The said cutters are held in place by means of a clamp which is bolted to the supporting-bar.

In the further description of the said invention which follows reference is made to the accompanying drawings, forming a part hereof, and in which—

Figure 1:
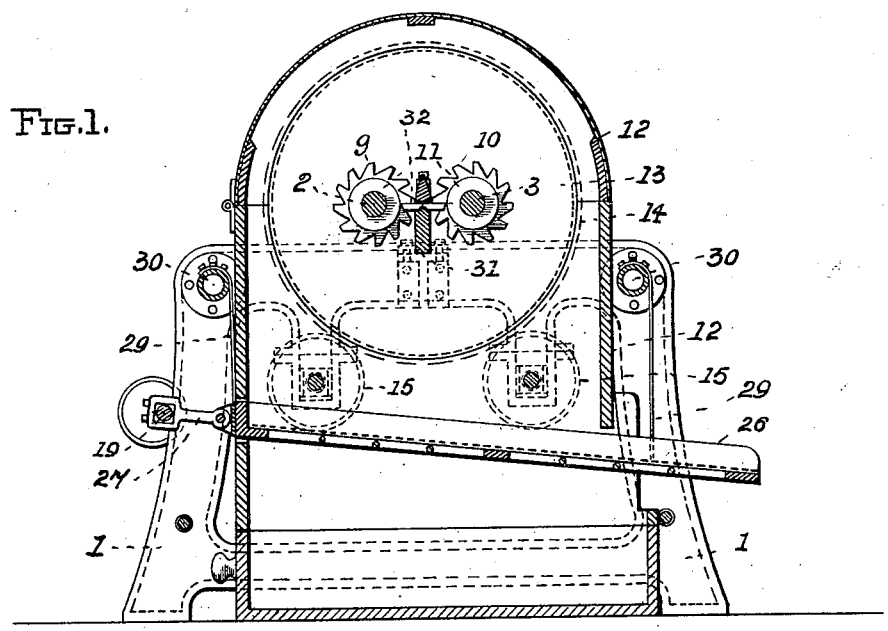
Figure 2:
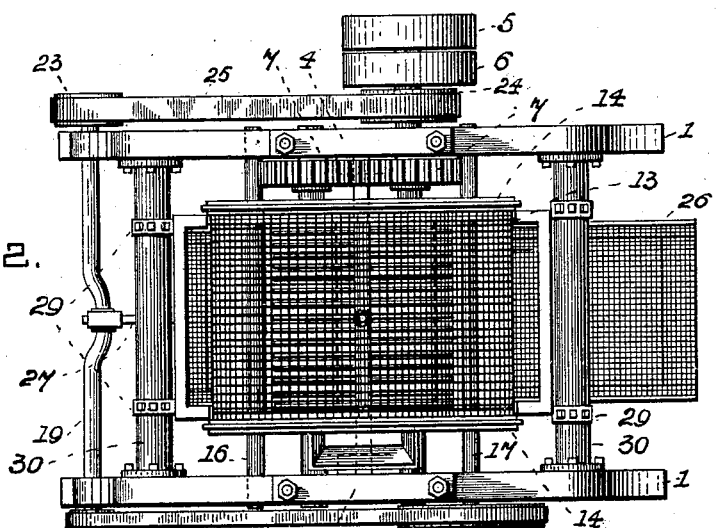
Figure 3:
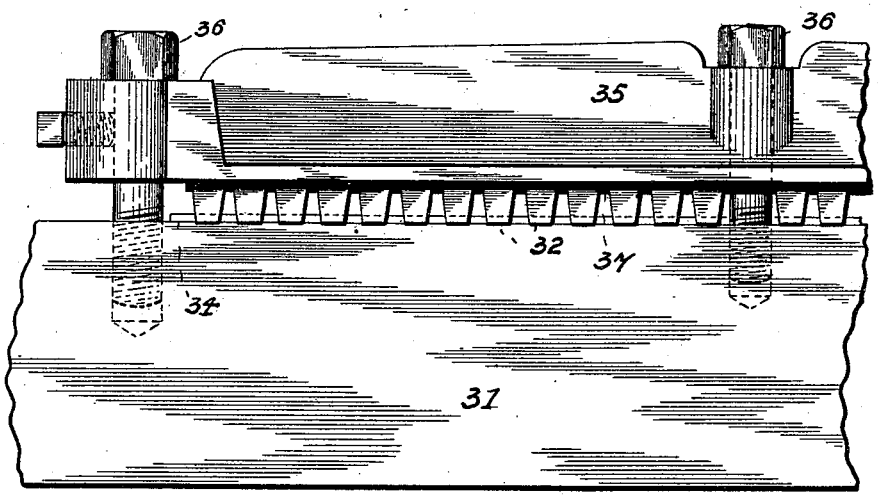
Figure 4:
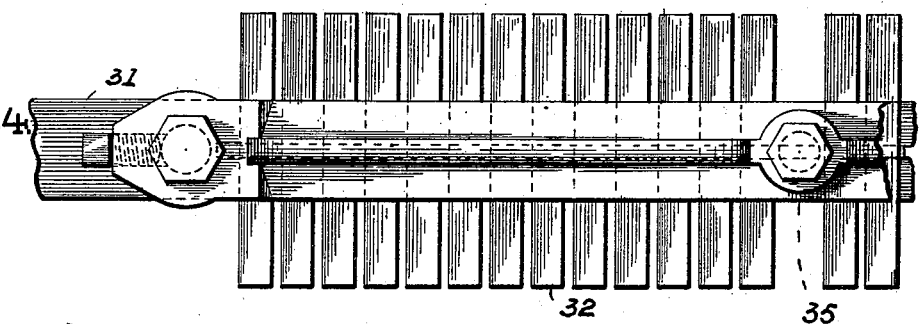
Figures 5, 6:
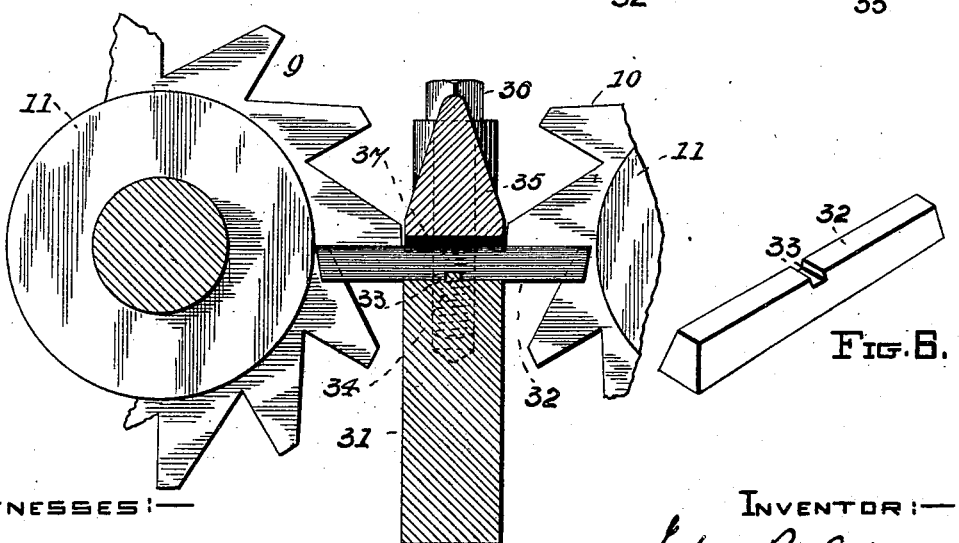

Figure 1 is a vertical section of the improved tobacco-cutter. Fig. 2 is a top view of the same with the upper part of the outer casing removed. Figs. 3, 4, 5, and 6 are enlarged details of the machine, the last named being a perspective view.

Referring now to the drawings, 1 is the frame of the machine.

2 and 3 are shafts resting and adapted to rotate in suitable bearing-boxes 4. The shaft 3 is the driving-shaft and is therefore provided with the tight and loose pulleys 5 and 6. The other shaft, 2, is driven from the driving-shaft 3 by means of the spur gear-wheels 7.

9 and 10 are rotary saws on the shafts 2 and 3, separated by spacing-collars 11, and they and the spacing-collars are clamped together by means of nuts (not shown) in a manner substantially the same as that illustrated in Letters Patent No. 400,723, before referred to.

12 is a casing in two parts, the upper part being hinged to the lower one, as shown in Fig. 1.

13 is an open-ended rotary sieve provided with a feeding-hopper and having bands 14 on its ends, which rest on the rollers 15. (Shown only in dotted lines and that in Fig. 1.) The shafts 16 and 17 of these rollers are shown in Fig. 2, and the one 17 is driven from the crank-shaft 19 by the pulleys 20 and 21 and the belt 22. The crank-shaft 19 receives its motion from the main driving-shaft 3 through the medium of the pulleys 23 and 24 and the belt 25.

26 is a wire-cloth screen shaken by means of the link 27, which is united to the crank-shaft 19.

The screen 26 is suspended by straps 29 from the bars 30, forming parts of the frame 1.

The machine thus far described in connection with the drawings embodies no new features over and above the inventions shown and described in the said Letters Patent, and I will now describe in connection with the drawings the elements and combinations of elements of the machine which constitute the present invention.

31 is a fixed bar situated in the lower section of the casing 12 and extending longitudinally of the saw-shafts 2 and 3. The upper edge of this bar is about on a line drawn between the centers of the said shafts, and upon it rest the cutters 32. These cutters (see Figs. 3, 4, 5, and 6) consist of straight steel bars of a length slightly less than the distance between the peripheries of the spacing-collars 11, which separate the saws 9 and 10 and of a width equal to the spaces between the saws. At the bottom the width of the said cutters is somewhat less to provide clearance for the tobacco worked and to give a better cutting edge to coöperate with the saws. The ends of the cutters are beveled to give an edge which will be effective in clearing the spacing-collars 11 of adhering tobacco. The cutters have centering-notches 33 extending across their under side, into which the projecting rib 34 on the upper edge of the bar 31 enters. (See Fig. 5.) The cutters are held firmly to the bar 31 by the clamp 35 and the bolts 36, which enter the said bar.

In order to provide for any slight variation in the thickness of the cutters which would interfere with their being uniformly clamped, I insert between the cutters and the clamp a piece of some compressible material 37, such as rubber.

The operation of the machine is as follows: Tobacco is introduced into the rotary sieve through the hopper thereof and in the rotation of the sieve is carried upward and falls to the cutting devices, and that portion of the tobacco which is sufficiently reduced in size, together with the dust, passes through the sieve and falls to the shaking-screen, from which the coarser particles of the tobacco are delivered to any suitable receptacle placed exteriorly of the machine to receive them. The dust passes through the screen. The particles of tobacco which are too large to pass through the rotary sieve are carried upward and again fall on the cutters and are further reduced in size, when the separating process is repeated. In the continued operation of the machine the tobacco is all reduced to a practically uniform size.

I claim as my invention—

1. In a tobacco-cutter, the combination of a rotary sieve, a pair of rotary shafts situated within the sieve-carrying saws, a fixed cutter-supporting bar placed between the said saws, extending longitudinally of the saw-shafts, the said bar having a longitudinally-extending rib on its upper surface, a series of independent straight cutters provided with a central transverse notch in their under side and having a flat upper surface, and a clamping-bar laid across the said cutters and bolted to the fixed bar, to hold the said cutters in place, substantially as specified.

2. In a tobacco-cutter the combination of a rotary sieve, a pair of rotary shafts situated within the sieve-carrying separated saws, a fixed cutter-supporting bar placed between the said saws, extending longitudinally of the saw-shafts, the said bar having a longitudinally-extending rib on its upper surface, a series of independent straight cutters provided with a central transverse notch in their under side, and having a flat upper surface, a clamping-bar laid across the said cutters and bolted to the fixed bar, to hold the said cutters in place, and a piece of compressible material interposed between the said cutters and their clamp, substantially as, and for the purpose specified.

JOHN B. ADT.

Witnesses:
OREGON MILTON DENNIS,
ESTEP T. GOTT.